United States Patent [19]
Kaufmann et al.

[11] Patent Number: 5,791,445
[45] Date of Patent: Aug. 11, 1998

[54] PISTON ROD-CYLINDER ASSEMBLY WITH SHRINK-WRAP CORROSION PROTECTIVE SLEEVE

[75] Inventors: Horst Kaufmann, Burgen; Peter Thurmann, Waldesch, both of Germany

[73] Assignee: Fichtel & Sachs Industries, Inc., Colmar, Pa.

[21] Appl. No.: 870,796

[22] Filed: Jun. 6, 1997

[51] Int. Cl.[6] ............................. F16F 9/38; B32B 31/00
[52] U.S. Cl. ........................ 188/322.12; 267/64.11; 156/86
[58] Field of Search ..................... 188/300, 322.12, 188/64.11, 64.12; 156/86

[56] References Cited

U.S. PATENT DOCUMENTS

| | | | |
|---|---|---|---|
| 3,653,651 | 4/1972 | Allinquant et al. | 267/64.11 |
| 3,850,141 | 11/1974 | Schmitt | 118/505 |
| 3,919,509 | 11/1975 | Schnitzius . | |
| 4,167,991 | 9/1979 | Karklins et al. | 188/322.12 |
| 4,372,429 | 2/1983 | Marx | 188/322.12 |
| 4,591,137 | 5/1986 | Steinberg | 267/182 |
| 4,643,407 | 2/1987 | Zirk | 267/64.27 |
| 5,074,390 | 12/1991 | Fuhrmann et al. | 188/322.12 |

FOREIGN PATENT DOCUMENTS

| | | |
|---|---|---|
| 3836897 | 5/1990 | Germany . |
| 3836898 | 5/1990 | Germany . |
| 4209985 | 9/1993 | Germany . |

*Primary Examiner*—Robert J. Oberleitner
*Assistant Examiner*—Chris Schwartz
*Attorney, Agent, or Firm*—Baker & Botts, L.L.P.

[57] ABSTRACT

A piston rod-cylinder assembly, such as a gas spring, includes a cylinder in which a piston rod is axially movable and connecting members on the cylinder and the piston rod for attachment of the assembly in use. The cylinder and an axial portion of the piston rod are covered by a shrink-wrap sleeve for corrosion protection and/or coloration. A lubricant layer is provided between the cylinder and the shrink-wrap sleeve adjacent one or both ends of the cylinder.

12 Claims, 1 Drawing Sheet

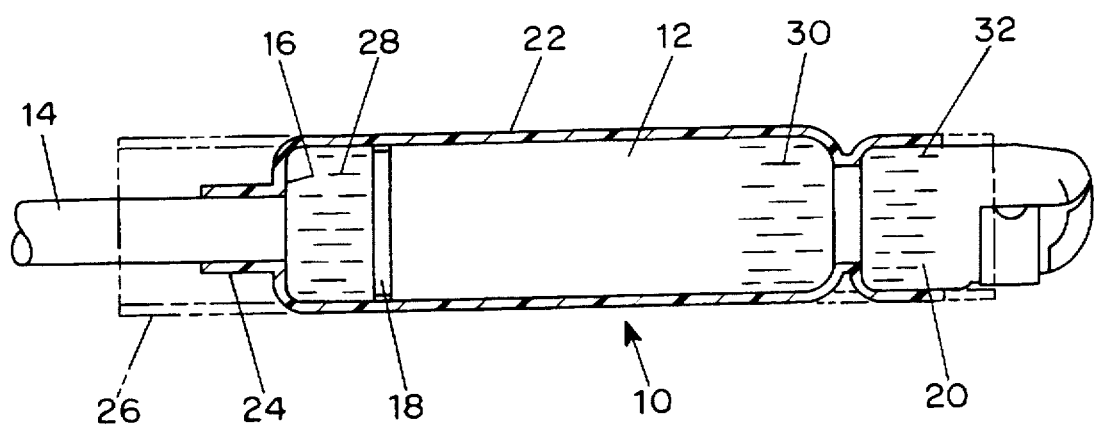

PISTON ROD-CYLINDER ASSEMBLY WITH SHRINK-WRAP CORROSION PROTECTIVE SLEEVE

BACKGROUND

1. Field of the Invention

The present invention concerns a piston rod-cylinder assembly with corrosion protection in the form of a shrink-wrap sleeve.

2. The Prior Art

Corrosion protection for the cylinder member of piston rod-cylinder assemblies, such as gas springs or other pneumatic and/or hydraulic units, has conventionally been provided by painting the exposed surfaces of the cylinder member with multiple layers of paint. Painting is a very resource-intensive manufacturing process by nature. Firstly, the cylinder surface must be thoroughly cleaned and degreased to remove all traces of manufacturing residue, the paint layers must then be applied and, finally, drying must be carried out quickly in order to favorably influence the manufacturing time. Significant quantities of solvent must be disposed of when the cylinder unit is dried and when the painting equipment is cleaned, particularly when changing colors. Disposal represents a significant financial and logistical expense, as well as an increasing environmental pollution problem. Moreover, the painted units must be handled very carefully during production to avoid damaging the paint. This also results in constraints on the manufacturing process since the cylinder must absolutely be prevented from striking any other object to avoid increasing the reject rate. DE 38 36 897A1 and DE 38 36 898A1 disclose prior art painting systems for piston rod-cylinder assemblies.

A piston rod-cylinder unit is known from DE 42 09 985 in which a shrink-wrap tube or sleeve is adhered to the cylinder surface in segments, by a hot-melt adhesive, in order to protect the painted surface of the cylinder. The segments are restricted to areas of the cylinder known to be at particular risk of corrosion. Thus painting of the cylinder is still required. Also, the sealing action of the sleeve against moisture penetration is not established until the hot-melt adhesive is applied. In addition, special measures, such as the use of a ring element, are required in this case at the piston rod exit end of the cylinder.

It is an object of the present invention to provide a corrosion protection system for a piston rod-cylinder assembly that overcomes the foregoing disadvantages of the prior art.

SUMMARY OF THE INVENTION

The present invention attains this and other objects by covering the cylinder over its entire exterior surface by a shrink-wrap tube or sleeve under preload. A lubricant layer is provided between the cylinder and the shrink-wrap sleeve, preferably at least at one or both ends of the cylinder, as a barrier against moisture and to enhance adhesion of the sleeve to the cylinder. Advantageously, the shrink-wrap sleeve covers the end face of the cylinder on the exit side of the piston rod and, in the shrunken state, has a cylindrical segment that wraps around an axial portion of the piston rod. The cylindrical segment forms a seal around the piston rod that prevents the penetration of moisture or other contaminants along the rod, while at the same time providing a gap for a lubricant film on the surface of the piston rod.

As the shrink-wrap sleeve can fulfill the functions of both corrosion protection and coloration, the cylinder itself need not be painted or otherwise surface treated, with the result that the entire painting process and attendant equipment can be eliminated. Also, the cylinder need not be precleaned before application of the shrink-wrap sleeve, thereby eliminating a further processing step of the prior art. Moreover, the cylinder requires no special care during assembly. If a scratch or scoring of the cylinder surface should occur, the shrink-wrap sleeve will compensate for this defect.

The fact that the shrink-wrap sleeve contacts the cylinder without the use of hotmelt adhesive also results in significant advantages over the prior state of the art. If the shrinkwrap sleeve is to be removed and reapplied for any reason, no adhesive residue remains to be dealt with.

According to a further advantageous feature, the shrink-wrap sleeve is imprinted before application to the cylinder to carry all of the identifying information that was previously imprinted on the painted cylinder in an additional process step.

BRIEF DESCRIPTION OF THE DRAWING

For a better understanding of the invention, reference may be made to the following detailed description and to the accompanying drawing of a preferred embodiment of a piston rod-cylinder assembly having a shrink-wrap covering in accordance with the invention.

DETAILED DESCRIPTION

In the embodiment shown in the drawing, a piston-cylinder assembly 10, e.g. a gas spring, includes a cylinder 12 in which a piston rod 14 is axially movable. As is conventional, the cylinder may include a pressurized gas and a piston rod guiding and sealing unit (not shown) captured between the closed end 16 of the cylinder 12 and a circumferential rib 18 rolled in the cylinder wall. Attachment of the piston rod-cylinder assembly during use is accomplished with connecting members, e.g., ball-and-socket type units, mounted on the cylinder 12 and the piston rod 14, respectively. Only the connecting member 20 on the cylinder 12 is shown in the drawing.

The cylinder 12, whose surface may be completely untreated or precleaned, is enclosed over its entire exterior surface by a shrink-wrap sleeve 22 as corrosion protection. In so doing, the end face 16 of the pressure tube on the exit side of the piston rod 14 is also preferably covered. In addition, the shrink-wrap sleeve has a cylindrical segment 24 that wraps around an axial portion of the piston rod 14, forming a seal which effectively prevents moisture or other contaminants from penetrating along the rod to the cylinder 12, while providing a gap for passage of a lubricant film on the piston rod. No adhesive need be applied between the shrink-wrap sleeve and the cylinder 12. Thus not only is the motion of the piston rod not impaired by the cylindrical sleeve segment 24, but no adhesive residue remains on the cylinder or rod in the event the sleeve 22 must be replaced. The piston rod itself will not corrode since its surface is typically chrome plated.

Preferably, the shrink-wrap sleeve 22 is imprinted beforehand with trademark or other manufacturing information of interest. As no adhesive is used, it can be guaranteed that the sleeve will not stick during printing.

The dashed lines 26 illustrate the size and configuration of the shrink-wrap sleeve 22 prior to the shrinking step. As the dashed lines 26 indicate, prior to heating the shrink-wrap sleeve 22 is longer than the cylinder 12. The excess length is used for necking between the cylinder 12 and the connecting member 20 as well to cover the end face 16 and to form the cylindrical segment 24. Also, prior to shrinking, the inner diameter of the shrink-wrap sleeve 22 is sufficiently larger than the outer diameter of the cylinder 12 to facilitate insertion of the piston rod-cylinder assembly 10 into the sleeve or telescoping of the sleeve over the assembly. After the heating phase, which is carried out at a heating temperature lower than the maximum permissible temperature for the piston rod seal (not shown), the shrink-wrap sleeve 22 makes wrinkle-free contact with the cylinder 12, the rod 14 and the connecting number 20.

The shrink-wrap sleeve may comprise any suitable plastic material with a type of shape memory such that an existing shape can be covered after cooling in a manner defined by tension.

In accordance with the invention, a lubricant layer is provided between the cylinder 12 and the shrink-wrap sleeve 22 as a barrier against moisture and for increased adherence of the sleeve to the cylinder surface. To conserve lubricant, the lubricant layer may be applied adjacent only one or both ends of the cylinder. The lubricant layer, which suitably is an oil, is indicated in the drawing by the cross hatched areas 28 and 30. If desired, a lubricant layer may also be provided between the sleeve 22 and the surface of the connecting member 20, as indicated by the cross hatched area 32. The lubricant may be applied before or after the sleeve is telescoped over the cylinder.

For appearance purposes, the lubricant is preferably colorless, or at least substantially so. This is of particular importance when the shrink-wrap sleeve 22 is transparent or translucent, as a dark colored lubricant may give the piston rod-cylinder assembly a flawed appearance. Although for reasons of economy and ease of application, oil is preferred for the lubricant layer, other lubricants may of course be used.

Although the invention has been described and illustrated herein by reference to a specific embodiment thereof, it will be understood that such embodiment is subject to modification and variation without departing from the inventive concepts disclosed. All such modifications and variations, therefore, are intended to be included within the spirit and scope of the appended claims.

We claim:

1. A piston rod-cylinder assembly, comprising:
   a cylinder having at least one open end;
   a piston rod extending into the cylinder through said at least one open end for axial movement relative to the cylinder;
   a guiding and sealing unit in said cylinder adjacent said at least one open end for guiding said axial movement of the piston rod and for establishing a seal between the piston rod and the cylinder;
   a corrosion resistant shrink-wrap sleeve covering the entire exposed surface of the cylinder under preload due to a shrinking process; and
   a lubricant layer between at least a portion of the surface of the cylinder and the shrink-wrap sleeve.

2. The piston rod-cylinder assembly of claim 1 wherein the shrink-wrap sleeve extends over and covers said at least one open end of the cylinder.

3. The piston rod-cylinder assembly of claim 2 wherein a portion of the shrink-wrap sleeve extends around and covers an axial segment of the piston rod adjacent said at least one open end of the cylinder.

4. The piston rod-cylinder assembly of claim 3, wherein the portion of the shrink-wrap sleeve that extends around the piston rod defines a gap with the piston rod that is dimensioned for passage of a lubricant film on the piston rod while preventing passage of contaminants inwardly along the piston rod.

5. The piston rod-cylinder assembly of claim 1, wherein the exterior surface of the cylinder is free of surface treatment for corrosion resistance, the sole corrosion protection for said exterior surface being provided by said shrink-wrap sleeve and lubricant layer.

6. The piston rod-cylinder assembly of claim 5, wherein the exterior surface of the cylinder is free of surface treatment for coloration, the sole coloration of said exterior surface being provided by said shrink-wrap sleeve.

7. The piston rod-cylinder assembly of claim 1, wherein the lubricant layer is a layer of oil.

8. The piston rod-cylinder assembly of claim 7, wherein the oil is substantially colorless.

9. The piston rod-cylinder assembly of claim 1, wherein the shrink-wrap sleeve is imprinted with identifying information prior to being shrunken onto the piston rod-cylinder assembly.

10. The piston rod-cylinder assembly of claim 1, wherein:
    the end of the cylinder opposite said at least one open end is closed;
    a connecting member is mounted on the closed end of the cylinder; and
    the shrink-wrap sleeve overlaps at least a portion of the connecting member.

11. The piston rod-cylinder assembly of claim 1, wherein the cylinder contains a pressurized gas which exerts a push-out force on the piston rod.

12. The piston rod-cylinder assembly of claim 1, wherein the lubricant layer is applied adjacent said at least one open end both ends of the cylinder.

* * * * *

UNITED STATES PATENT AND TRADEMARK OFFICE
CERTIFICATE OF CORRECTION

PATENT NO. : 5,791,445

DATED : August 11, 1998

INVENTOR(S) :
Horst Kaufmann and Peter Thurmann

It is certified that error appears in the above-identified patent and that said Letters Patent is hereby corrected as shown below:

Col. 4, line 49, "end both" should read --end or both--.

Signed and Sealed this

Twentieth Day of April, 1999

Attest:

Q. TODD DICKINSON

Attesting Officer     Acting Commissioner of Patents and Trademarks